US009132678B2

(12) United States Patent
Wakasa

(10) Patent No.: US 9,132,678 B2
(45) Date of Patent: Sep. 15, 2015

(54) RECORDING DEVICE, RECORDING SYSTEM, AND METHOD OF CONTROLLING RECORDING DEVICE

(75) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 515 days.

(21) Appl. No.: 13/360,268

(22) Filed: Jan. 27, 2012

(65) Prior Publication Data

US 2012/0198430 A1 Aug. 2, 2012

(30) Foreign Application Priority Data

Jan. 27, 2011 (JP) ................................. 2011-014866
Oct. 21, 2011 (JP) ................................. 2011-231416

(51) Int. Cl.
*G06K 15/00* (2006.01)
*B41J 29/38* (2006.01)

(52) U.S. Cl.
CPC ............... *B41J 29/38* (2013.01); *G06K 15/402* (2013.01)

(58) Field of Classification Search
None
See application file for complete search history.

(56) References Cited

U.S. PATENT DOCUMENTS

| 7,055,150 | B2* | 5/2006 | Terada et al. | 717/178 |
|---|---|---|---|---|
| 2003/0063305 | A1* | 4/2003 | McIntyre | 358/1.13 |
| 2004/0210894 | A1* | 10/2004 | Zarco | 717/171 |
| 2007/0055970 | A1* | 3/2007 | Sakuda et al. | 717/168 |
| 2007/0169104 | A1* | 7/2007 | Morita | 717/170 |
| 2008/0127159 | A1* | 5/2008 | Regenmorter | 717/168 |
| 2008/0158590 | A1 | 7/2008 | Lim | |
| 2008/0178171 | A1* | 7/2008 | Sueyoshi et al. | 717/171 |
| 2008/0189693 | A1* | 8/2008 | Pathak | 717/168 |
| 2009/0144718 | A1* | 6/2009 | Boggs et al. | 717/170 |
| 2010/0058360 | A1 | 3/2010 | Asai | |
| 2010/0169876 | A1* | 7/2010 | Mann | 717/170 |
| 2010/0169877 | A1* | 7/2010 | Ackerman et al. | 717/171 |

FOREIGN PATENT DOCUMENTS

| CN | 101251790 A | 8/2008 |
|---|---|---|
| JP | 2007-055042 A | 3/2007 |
| JP | 2008-071077 A | 3/2008 |
| JP | 2009-149015 A | 7/2009 |

(Continued)

OTHER PUBLICATIONS

Ma et al. "Mobile terminal capability management for services enabling." Wireless and Mobile Communications, 2006. ICWMC'06. International Conference on. IEEE, 2006. Retrieved on [May 1, 2015] Retrieved from the Internet: URL<http://ieeexplore.ieee.org/stamp/stamp.jsp?tp=&arnumber=4124223>.*

(Continued)

*Primary Examiner* — Thuy Dao
*Assistant Examiner* — Cheneca Smith
(74) *Attorney, Agent, or Firm* — Kilpatrick Townsend & Stockton LLP

(57) ABSTRACT

A recording device has a recording unit that records on a recording medium; a control unit that controls the recording unit; a storage unit that stores management information related to control by the control unit, and report information corresponding to the management information; an input unit that inputs information to change the report information; and an output unit that outputs the report information stored in the storage unit.

7 Claims, 4 Drawing Sheets

(56) References Cited

FOREIGN PATENT DOCUMENTS

| | | |
|---|---|---|
| JP | 2010-009164 A | 1/2010 |
| JP | 2010-061469 A | 3/2010 |
| JP | 2010-181927 A | 8/2010 |
| JP | 2011-043896 A | 3/2011 |

OTHER PUBLICATIONS

Zelenik et al. "Remote updating procedures for mobile point of sale terminals." WSEAS Transactions on Information Science and Applications 6.11 (2009): pp. 1739-1750. Retrieved on [May 1, 2015] Retrieved from the Internet: ??URL<http://www.wseas.us/e-library/transactions/information/2009/29-752.pdf>.*

* cited by examiner

| ACTUAL FIRMWARE VERSION NUMBER | ACTUAL FIRMWARE VERSION STRING | ACTUAL MODEL ID | ACTUAL ORIGINAL ID | ACTUAL ROM VERSION |
|---|---|---|---|---|
| 10.00 | firm.Ver.10 | 10001 | 10000 | rom.a.Ver.1 |

| REPORTED FIRMWARE VERSION NUMBER | REPORTED FIRMWARE VERSION STRING | REPORTED MODEL ID | REPORTED ORIGINAL ID | REPORTED ROM VERSION |
|---|---|---|---|---|
| 2 | rewritten version:2nd | 10001 | 10000 | ROMA-1 |

RECORDING DEVICE, RECORDING SYSTEM, AND METHOD OF CONTROLLING RECORDING DEVICE

This application claims priority to Japanese Patent Application Nos. 2011-014866, filed Jan. 27, 2011 and 2011-231416, filed Oct. 21, 2011, the entireties of which are expressly incorporated by reference herein.

BACKGROUND

1. Technical Field

The present invention relates to a recording device that records on recording media, a recording system including a recording device and a control device capable of connecting to the recording device, and a method of controlling a recording device.

2. Related Art

Recording devices that store executable firmware and can perform operations related to recording by functions of the firmware, and store firmware version information, are known from the literature. See, for example, Japanese Unexamined Patent Appl. Pub. JP-A-2009-149015. The stored firmware information may be displayed on a display panel so that the firmware version can be checked.

Management information (such as firmware version information) describing the state of specific components (such as the firmware) such as in the recording device described above is set by the manufacturer and is not always in a display format that is easy for the user to understand. Because the management information is information describing the state of specific components, it must be a value corresponding as much as possible to the actual state of the component. User convenience must therefore be assured while also assuring the reliability of the management information.

SUMMARY

The invention assures user convenience while also assuring the reliability of the management information.

A first aspect of the invention is a recording device having: a recording unit that records on a recording medium; a control unit that controls the recording unit; a storage unit that stores management information related to control by the control unit, and report information corresponding to the management information; an input unit that inputs information to change the report information; and an output unit that outputs the report information stored in the storage unit.

The user can rewrite the report information for the user's convenience to values that are easy for the user to understand or easy to manage. By storing management information and report information corresponding to the management information, the reliability of the management information can be assured while also assuring user convenience.

In another aspect of the invention, the report information is not overwritten when the management information stored in the storage unit is overwritten if the report information stored in the storage unit was previously changed based on information input by the input unit, and the report information stored in the storage unit is changed based on the overwritten management information if the report information was not changed by the input unit.

When the report information is overwritten, retaining the values that were written for the user's convenience is more convenient for the user than overwriting the report information according to a change in the state of a managed component even if the state of the component has changed.

When the management information of the invention changes and the report information was previously changed by the user, the report information is not changed and user convenience is improved because the values saved by the user are retained. If the report information has not been overwritten, however, the report information is changed according to the change in the management information, and the values of the report information are desirably prevented from becoming unnecessarily different from the values of the management information. As a result, the reliability of the management information can be assured while assuring user convenience by enabling changing the content of the management information. Examples of management information include information related to firmware, information related to communication components, and information related to recording settings.

Information about communication components such as the communication program, the usable protocols, interface specifications, and the version of the interface board can change. Recording-related settings such as font information, recording speed, and print density settings can also change.

In a recording device according to another aspect of the invention, firmware is input to the control unit, and the control unit controls the recording unit based on the firmware; and the management information stored in the storage unit includes information related to the firmware.

Firmware that controls the basic operation of the recording device may be overwritten or updated when the version changes to add new functions or solve a problem.

When the firmware is changed and the report information was previously changed by the user, user convenience is improved because the values previously saved by the user are retained instead of changing the report information. However, if the report information was not previously changed by the user, the report information is changed according to the change of the management information, and the values of the report information are desirably prevented from becoming unnecessarily different from the values of the management information. As a result, the reliability of the management information can be assured while assuring user convenience by enabling changing the content of the management information.

In a recording device according to another aspect of the invention, the output unit outputs the report information to the recording unit; and the recording unit records the report information output by the output unit to the recording medium.

A recording device according to another aspect of the invention preferably also has a display unit that displays the report information; wherein the output unit outputs the report information to the display unit.

Because the management information output unit outputs the values written by the user for report information that the user changed for the user's convenience, the user can easily learn the condition of specific components based on information output in a format convenient for the user.

By outputting a recording medium on which the report information is recorded, the content of the report information can be desirably reported. More particularly, because the values of the report information recorded on the recording medium are the values that were saved by the user, the user can easily determine the condition of specific components by referring to the recording medium on which the report information is recorded.

Another aspect of the invention is a recording system including: a recording unit that records on a recording medium; a control unit that controls the recording unit; a storage unit that stores management information related to control by the control unit, and report information corresponding to the management information; an input unit that inputs information to change the report information; an output unit that outputs the report information stored in the storage unit; and a transmission unit that transmits information related to the management information.

The user can rewrite the report information for the user's convenience to values that are easy for the user to understand or easy to manage. By storing management information and report information corresponding to the management information, the reliability of the management information can be assured while also assuring user convenience.

In a recording system according to another aspect of the invention the report information is not overwritten when the management information stored in the storage unit is overwritten if the report information stored in the storage unit was previously changed based on information input by the input unit, and the report information stored in the storage unit is changed based on the overwritten management information if the report information was not changed by the input unit.

When the management information of the invention changes and the report information was previously changed by the user, the report information is not changed and user convenience is improved because the values saved by the user are retained. If the report information has not been overwritten, however, the report information is changed according to the change in the management information, and the values of the report information are desirably prevented from becoming unnecessarily different from the values of the management information. As a result, the reliability of the management information can be assured while assuring user convenience by enabling changing the content of the management information. Examples of management information include information related to firmware, information related to communication components, and information related to recording settings. In addition, because the report information is displayed on the display unit by the control device, the user can easily reference the report information that was written for the user's own convenience.

Another aspect of the invention is a method of controlling a recording device, the control method including steps of updating firmware that controls a recording unit that records to a recording medium; overwriting control-related management information based on updating the firmware; and outputting report information that was changed based on information input by an input unit if the report information is changed based on information input by the input unit when output of report information including information related to the firmware is requested after the firmware is updated, and outputting the report information based on the overwritten management information when the report information for the firmware is changed by an input unit.

With the control method according to this aspect of the invention, when the management information of the invention changes and the report information was previously changed by the user, the report information is not changed and user convenience is improved because the values saved by the user are retained. If the report information has not been overwritten, however, the report information is changed according to the change in the management information, and the values of the report information are desirably prevented from becoming unnecessarily different from the values of the management information. As a result, the reliability of the management information can be assured while assuring user convenience by enabling changing the content of the management information. Examples of management information include information related to firmware, information related to communication components, and information related to recording settings.

The invention can thus assure user convenience while assuring the reliability of management information by enabling changing the content of the management information.

BRIEF DESCRIPTION OF THE DRAWINGS

FIG. 2 (A) shows an example of actual management data (management data), and (B) shows the management data reported to the user (report data).

DESCRIPTION OF EMBODIMENTS

A preferred embodiment of the present invention is described below with reference to the accompanying figures.

Figure 1:
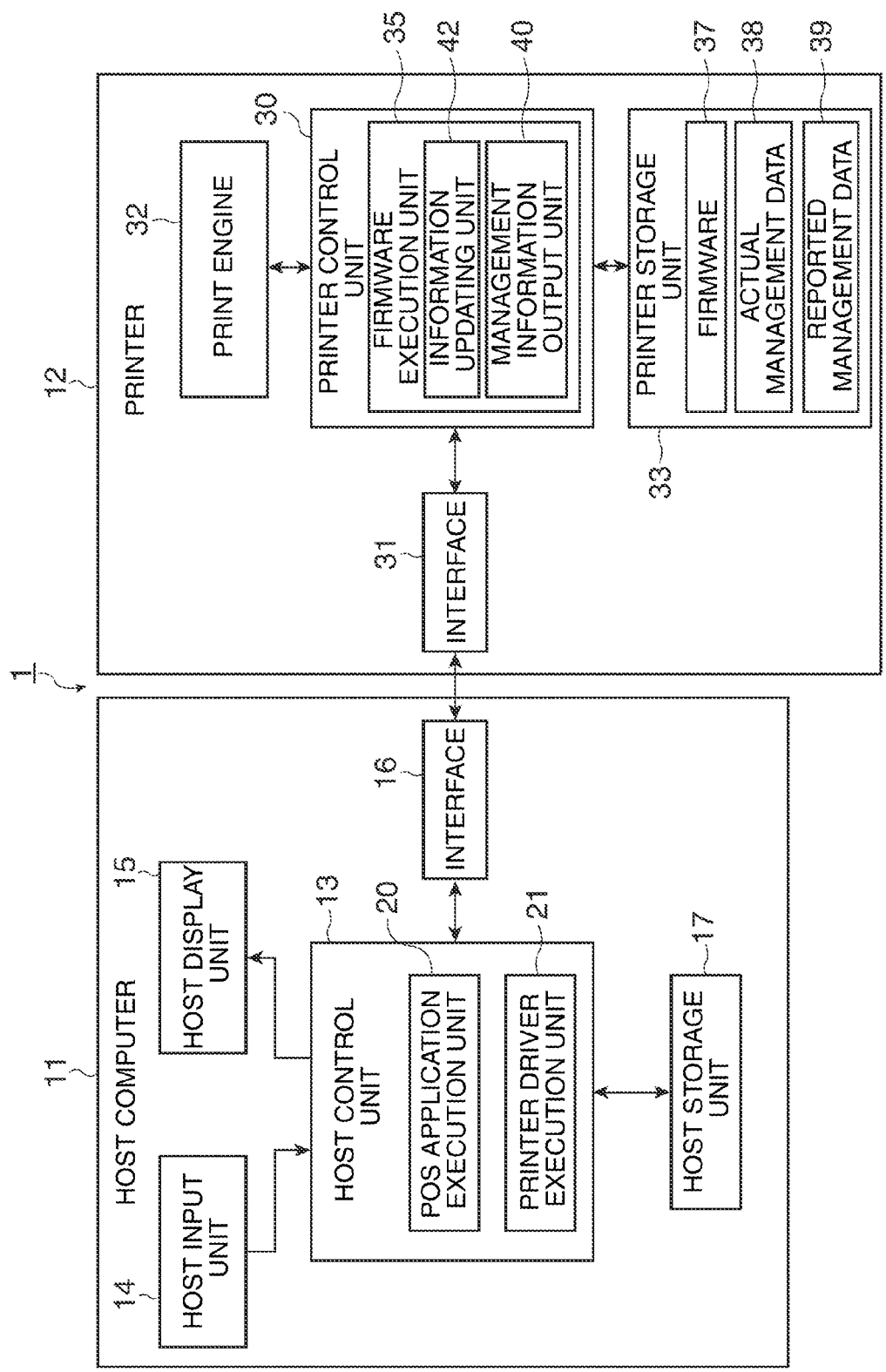
FIG. 1 is a block diagram showing the functional configuration of a recording system according to the invention.

FIG. 1 is a block diagram showing the configuration of a recording system 1 according to a preferred embodiment of the invention.

As shown in FIG. 1, the recording system 1 includes a host computer 11 (control device) and a printer 12 (recording device) connected communicably to the host computer 11.

The host computer 11 is a POS terminal that is installed at the checkout counter of a retail store, for example, has an point-of-sale system (POS system) installed for processing sales and payments, and issues a receipt for each transaction using the printer 12. Issuing a receipt means recording information related to the purchase of products in a transaction and specific images such as a store logo on thermal roll paper (recording medium), and then cutting the thermal roll paper to produce a receipt as a single piece of paper.

As shown in FIG. 1, the host computer 11 includes a host control unit 13, host input unit 14, host display unit 15, interface 16, and host storage unit 17.

The host control unit 13 controls the host computer 11, and includes a CPU that runs programs, ROM that stores the basic control program executed by the CPU, RAM used as working memory to temporarily store programs executed by the CPU and process data, and other peripheral circuits. The host control unit 13 has a POS application execution unit 20 and printer driver execution unit 21 which are further described below.

The host input unit 14 is connected to input devices such as a keyboard with a sale registration key and other keys operated by the operator, a mouse, barcode scanner, card reader, and detects operation of the input devices. Detected operations are output as operation signals to the host control unit 13. Values detected by the input devices are also output to the host control unit 13.

The host display unit 15 has an LCD display or other type of display panel, and displays information such as the content of the sale registration and payment processes on the display panel as controlled by the host control unit 13.

The interface 16 communicates with the printer 12 according to a specific communication protocol as controlled by the host control unit 13.

The host storage unit 17 includes a hard disk drive or nonvolatile memory such as flash memory, and rewritably stores data.

The printer 12 (recording device) is a thermal line printer that issues receipts by conveying thermal roll paper (recording medium) wound in a roll using a conveyance mechanism (not shown in the figure) and applying heat to the recording surface of the thermal roll paper using a line thermal head (not shown in the figure) to record text and images, and then cutting the thermal roll paper at a specific position using a cutting mechanism (not shown in the figure), as controlled by the host computer 11.

As shown in FIG. 1, the printer 12 has a printer control unit 30 (control unit), interface 31, print engine 32, and printer storage unit 33 (storage unit).

The printer control unit 30 controls other parts of the printer 12, and includes a CPU, ROM, RAM, and other peripheral circuits similarly to the host control unit 13 described above.

The printer control unit 30 has a firmware execution unit 35. The firmware execution unit 35 controls other parts of the printer 12 by reading and running firmware 37 stored in the printer storage unit 33. The firmware 37 is software for executing operations including operations related to printing by the printer 12.

The interface 31 communicates with the host computer 11 according to a specific communication protocol as controlled by the printer control unit 30.

The print engine 32 monitors the output values of sensors including a paper edge sensor and remaining paper sensor as controlled by the printer control unit 30. In addition to the line thermal head, the print engine 32 operates a paper feed motor to drive the platen roller that conveys the thermal roll paper, and a cutter drive motor to drive the cutter of the cutting mechanism described above. The print engine 32 issues receipts by recording images on the thermal roll paper and cutting the thermal roll paper on which the images were recorded. The firmware execution unit 35 controls the print engine 32 by reading and running firmware 37.

The printer storage unit 33 is a hard disk drive or nonvolatile memory such as flash memory, and stores data rewritably. The firmware 37 is stored in the printer storage unit 33. The actual management data 38 (management information) and the reported management data 39 (report information) stored in the printer storage unit 33 are described below.

The basic operation of the recording system 1 when issuing one receipt is described next by describing the POS application execution unit 20 and printer driver execution unit 21.

The POS application execution unit 20 executes a POS application that is preinstalled to the host computer 11, and for each transaction accesses a specific server, for example, to get the information to be printed on the receipt. This information includes, for example, information identifying the products purchased in the transaction, information indicating the product prices, and information indicating the total purchase amount. The POS application execution unit 20 also generates the print data to be recorded on the receipt based on the acquired information, and outputs the print data to the printer driver execution unit 21.

By running a printer driver preinstalled on the host computer 11, the printer driver execution unit 21 generates control commands conforming to the command language of the printer 12 based on the print data input from the POS application execution unit 20, and outputs to the printer control unit 30 of the printer 12. These control commands include commands causing the paper feed mechanism to convey the thermal roll paper, commands for driving the line thermal head to record images, and commands causing the cutting mechanism to cut the thermal roll paper.

The firmware execution unit 35 of the printer control unit 30 to which the control commands are input controls the print engine 32 to execute operations related to issuing receipts according to the control commands.

The actual management data 38 and reported management data 39 stored by the printer storage unit 33 are described next.

FIG. 2A describes the actual management data 38, and FIG. 2B describes the reported management data 39.

As shown in FIG. 2A, the actual management data 38 includes at least the actual firmware version number, a text string for the actual firmware version, the actual model ID, the actual original ID, and the actual ROM version.

The actual firmware version number is a number identifying the version of the firmware 37 actually installed in the printer. This version number is a number identifying which generation the firmware 37 is, and is generally a sequential number with a decimal part such as 10.00.

More specifically, the actual firmware version number contained in the actual management data 38 is a value identifying the actual version of the firmware 37 stored in the printer storage unit 33, and when the firmware 37 version changes as a result of overwriting or updating the firmware 37, indicates the version after the firmware 37 is updated. That is, when the version of the firmware 37 installed in the printer changes as a result of overwriting or updating the firmware 37, the printer control unit 30 automatically overwrites the actual firmware version number contained in the actual management data 38 to a value indicating the version of the new firmware 37. This maintains a state in which the actual firmware version number contained in the actual management data 38 is always a number identifying the actual version of the installed firmware 37.

The actual firmware version text string is information identifying the version of the firmware 37 as a text string. In addition to using a number representing the firmware generation, the firmware 37 version may be expressed as a name composed of a text string including letters and numbers, and the name expressed by this text string corresponds to a text string denoting the version.

The actual firmware version text string contained in the actual management data 38 is more particularly a value denoting the actual version of the firmware 37 stored in the printer storage unit 33, and denotes the version of the new firmware 37 after the firmware 37 version is changed in conjunction with overwriting or updating the firmware 37.

The actual model ID is identification information denoting the printer 12 model. The actual model ID contained in the actual management data 38 is more specifically a value denoting the model ID of the printer 12.

When the printer 12 was developed and manufactured by improving or modifying a specific printer, the actual original ID is the model ID of the specific printer on which the development and production was based. For example, if the printer 12 was developed as an upgraded version of a printer with a model ID of 10000, the model ID 10000 is the actual original ID.

The actual ROM version is information denoting the version of the ROM used in the printer control unit 30. More specifically, the actual ROM version information contained in the actual management data 38 is a value denoting the actual version of the ROM.

The actual model ID, actual original ID, and actual ROM version are fixed values, and are stored during printer 12 production.

The actual management data 38 is stored in a storage area to which access for rewriting data is limited, that is, a storage area having an address that is not disclosed to the user or other unauthorized persons (referred to below as simply "users"). The values stored in the actual management data 38 cannot be changed by user commands. Modifying the information contained in the actual management data 38 is therefore restricted, and the reliability of the invention is assured.

Note that persons with specific authority, such as the manufacturer of the printer 12 and service technicians associated with system integrators that install point-of-sale management systems (POS systems), can operate the host computer 11 to display the values of the information contained in the actual management data 38 on the display panel. The information could also be referenced and values in the information overwritten by, for example, connecting a special terminal to the printer 12 and operating the terminal to display the values of the information contained in the actual management data 38 on the display panel of the terminal.

The information contained in the actual management data 38 corresponds to management information denoting the actual state of components used to record on thermal roll paper. That is, the actual firmware version number and the actual firmware version text string are information describing the actual state (actual version) of the firmware 37, which is a component essential to recording on the recording medium. The actual model ID and the actual original ID are information denoting the actual state (actual model ID, actual original ID) of the printer 12, which is another component. The actual ROM version information is information denoting the actual state (ROM version) of the ROM, which is another component.

As shown in FIG. 2B, the reported management data 39 includes at least reported firmware version number information, reported firmware version string information, the reported model ID, the reported original ID, and the reported ROM version.

The reported firmware version number information is the data that is referenced by the management information output unit 40 when the number indicating the firmware 37 version is reported in a specific format. More specifically, when the number denoting the firmware 37 version is reported, the value indicated by the reported firmware version number information is reported, and the user reads the value denoted by the reported firmware version number information as the number identifying the firmware 37 version. As described below, the reported firmware version number information contained in the reported management data 39 can be overwritten by a user instruction.

The reported firmware version string information is the data that is referenced by the management information output unit 40 when the text string identifying the firmware 37 version is reported in a specific format. The reported model ID, reported original ID, and reported ROM version are the data that is referenced by the management information output unit 40 when the actual model ID, actual original ID, and actual ROM version information are reported in a specific format. As described below, the content of the reported firmware version string information, reported model ID, reported original ID, and reported ROM version information can be overwritten by a user instruction.

Note that the information contained in the reported management data 39 corresponds to the reported management information (reported information).

The content of the information contained in the reported management data 39 can be overwritten by a user command.

More specifically, the printer driver execution unit 21 has a function for displaying on the display panel a configuration window 45 for rewriting information contained in the reported management data 39.

Figure 3:
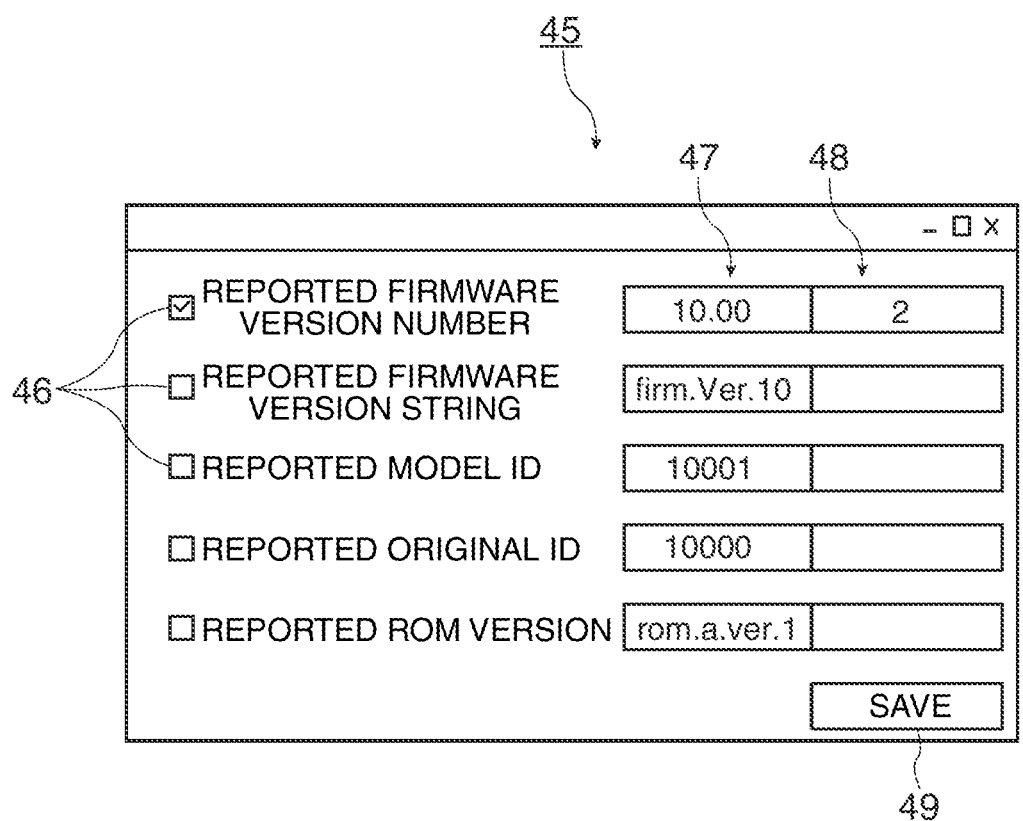
FIG. 3 shows an example of a window for setting an overwrite instruction.

FIG. 3 shows an example of the configuration window 45.

As shown in FIG. 3, the configuration window 45 has check boxes 46 for the reported firmware version number information, reported firmware version string information, reported model ID, reported original ID, and reported ROM version information contained in the reported management data 39. The check boxes 46 are input boxes for specifying the information to be overwritten, and the user checks the check boxes 46 for the information to be overwritten.

A current value display column 47 in which the values of the reported management data 39 before the information is changed (the current values) are displayed is provided in the configuration window 45, and values before the information is changed are displayed in the current value display column 47. The printer driver execution unit 21 acquires the reported management data 39 by communicating with the firmware execution unit 35, and the appropriate values are displayed in the respective fields of the current value display column 47 based on the acquired reported management data 39.

An input column 48 for entering the new values based on the information contained in the reported management data 39 is also provided in the configuration window 45. The user inputs the new values for the information to be changed in the corresponding fields of the input column 48.

The operation of the printer driver execution unit 21 and firmware execution unit 35 when rewriting the reported firmware version number information contained in the reported management data 39 using the configuration window 45 is described next. In this case, the user checks the check box 46 corresponding to the reported firmware version number information, inputs the new value of the reported firmware version number information in the corresponding field of the input column 48, and then clicks the save button 49 to register the change.

Triggered by the save button 49 being operated, the printer driver execution unit 21 generates and outputs to the firmware execution unit 35 a command for changing the value of the reported firmware version number information in the reported management data 39 to the value input by the user to the input column 48. Based on the command input to an input unit not shown of the firmware execution unit 35, the firmware execution unit 35 rewrites the reported firmware version number information contained in the reported management data 39 to the value input by the user.

The values of information contained in the reported management data 39 can thus be overwritten based on user instructions.

The operation of the printer 12 when the firmware 37 is overwritten is described next.

Figure 4:
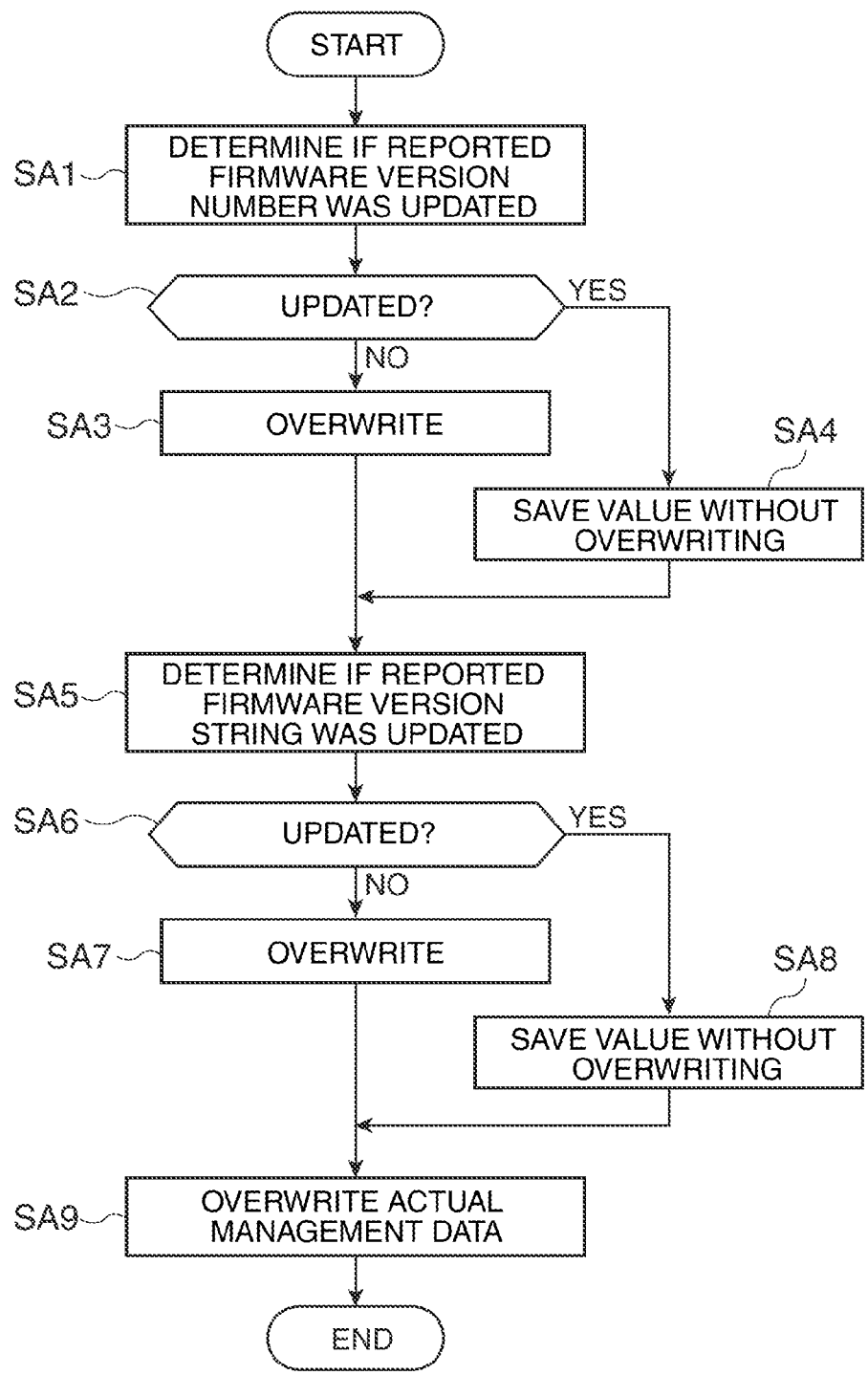
FIG. 4 is a flow chart of printer operation.

FIG. 4 is a flow chart of the operation of the printer 12 after the firmware 37 is successfully rewritten.

Note that the function of the information updating unit 42 in the operation described below is achieved by the cooperation of hardware and software, such as the CPU running the firmware 37.

In addition, rewriting the firmware 37 is a concept broadly including updating firmware 37 installed in the printer and otherwise modifying the firmware 37, and particularly includes firmware 37 modifications involving version changes.

Yet further, the actual values of the actual model ID, actual original ID, and actual ROM version information are not changed in conjunction with rewriting the firmware 37.

As shown in FIG. 4, when the firmware 37 installed in the printer is overwritten, the firmware execution unit 35 of the printer control unit 30 in the printer 12 first determines if the user has overwritten the reported firmware version number information in the reported management data 39 (step SA1). The user overwriting the reported firmware version number information means that the user has changed the value of the reported firmware version number information at least once using the configuration window 45 described above.

Step SA1 is performed as follows.

As described below, the reported firmware version number information contained in the reported management data 39 will be the number denoting the version of the actual firmware 37 unless the value has been changed by a user instruction. If the value has not been changed by a user instruction, the value of the reported firmware version number information contained in the reported management data 39 will match the value of the actual firmware version number contained in the actual management data 38. As a result, in step SA1 the firmware execution unit 35 compares the value of the actual firmware version number and the value of the reported firmware version number information contained in the reported management data 39 before the firmware 37 is overwritten. If the values match, the reported firmware version number information contained in the reported management data 39 is determined to have not been overwritten by the user. If the values do not match, the reported firmware version number information contained in the reported management data 39 is determined to have been overwritten by the user.

Note that a configuration that uses flags to track if information contained in the reported management data 39 has been overwritten, and determines from the state of a flag if the reported firmware version number information was overwritten by the user, is also conceivable.

For this example the user is assumed to change the value of the reported firmware version number information contained in the reported management data 39 for the purpose described below.

More specifically, the user may change the reported firmware version number to a value that is easier to understand as the value of the firmware 37 version, or is easier for the user to manage. For example, a user that finds the number denoting the firmware 37 version to be easier to understand when written with a hyphen instead of a decimal point may change the reported firmware version number from the value 10.00 to the value 10-00. Alternatively, a user that wants to manage the firmware 37 version using the number of times the firmware 37 has been overwritten may change the value of the reported firmware version number to 0 when the firmware 37 has not been overwritten even 1 time. Further alternatively, the value of the reported firmware version number may be changed to a value of 2 if the firmware 37 has not been overwritten even 1 time.

By thus overwriting the reported firmware version number information to a value that is easy for the user to understand or manage, the reported content will be easy for the user to understand when the reported firmware version number is reported by the management information output unit 40 described below.

If the result of step SA1 is that the reported firmware version number information was not overwritten by the user (step SA2 returns No), the information updating unit 42 of the firmware execution unit 35 overwrites the value of the reported firmware version number information contained in the reported management data 39 with the value denoting the actual version of the firmware 37 after the firmware 37 is overwritten (step SA3). Note that the number denoting the actual version of the firmware 37 after the firmware 37 is overwritten is stored in a specific storage area that is different from the storage area storing the reported management data in the printer storage unit 33 in conjunction with overwriting the firmware 37, and the information updating unit 42 references this specific storage area to get the number denoting the actual version of the firmware 37 after the firmware 37 is overwritten.

If the result of step SA1 is that the reported firmware version number information was overwritten by the user (step SA2 returns Yes), the information updating unit 42 of the firmware execution unit 35 does not overwrite the value of the reported firmware version number information contained in the reported management data 39 and keeps the stored value (step SA4).

The value of the reported firmware version number is thus overwritten with the number denoting the actual version of the firmware 37 when the firmware 37 is overwritten in this embodiment of the invention if the reported firmware version number information was not previously overwritten by the user. However, if the reported firmware version number was previously overwritten by the user, the value of the reported firmware version number information is not overwritten. The reason for this is described below.

When the reported firmware version number has been overwritten by the user, the value of the reported firmware version number has probably been changed to a value that is easier for the user to understand or manage as described above. Therefore, if the reported firmware version number was previously overwritten by the user when the firmware 37 is overwritten, retaining the user-defined value that is easy for the user to understand or manage is more convenient for the user than changing the reported firmware version number according to the overwritten firmware. This embodiment of the invention therefore does not overwrite the reported firmware version number information if the reported firmware version number has been previously changed by the user.

Note that this can temporarily result in the value of the reported firmware version number not corresponding to the actual firmware 37 version. However, there is a strong possibility that when the firmware 37 is overwritten a user who has overwritten the reported firmware version number will also change the value of the reported firmware version number to a value that is easy to understand or manage and reflects the new version of the firmware 37, and this mismatch will be resolved.

In addition, when the reported firmware version number has not been overwritten by the user, the user will also probably not overwrite the value of the reported firmware version number after the firmware is changed.

If the reported firmware version number has not been overwritten by the user before the firmware 37 is overwritten, the value of the reported firmware version number is therefore overwritten to the number denoting the actual version of the firmware 37 when the firmware 37 is overwritten in this embodiment of the invention. As a result, the reported firmware version number information continues to be a value denoting the actual version of the firmware 37 even when the user does not overwrite the value of the reported firmware version number, and user convenience is improved. The value of the reported firmware version number can also be prevented from becoming unnecessarily different from the actual version number.

Referring again to FIG. 4, after step SA3 or step SA4, the firmware execution unit 35 determines if the reported firmware version string information contained in the reported management data 39 has been changed by the user (step SA5). This determination can be done using the same method used for the decision in step SA1.

If the result of step SA5 is that the reported firmware version string information was not overwritten by the user (step SA6 returns No), the information updating unit 42 of the firmware execution unit 35 overwrites the value of the reported firmware version string information contained in the reported management data 39 with a string denoting the actual version of the firmware 37 after the firmware 37 is overwritten (step SA7). Note that the string denoting the actual version of the firmware 37 after the firmware 37 is overwritten is stored in a specific storage area in the printer storage unit 33 in conjunction with overwriting the firmware 37, and the information updating unit 42 references this specific storage area to get the string denoting the actual version of the firmware 37 after the firmware 37 is overwritten.

If the result of step SA5 and SA6 are that the reported firmware version string information was overwritten by the user (step SA6 returns Yes), the information updating unit 42 of the firmware execution unit 35 does not overwrite the value of the reported firmware version string information contained in the reported management data 39 and keeps the stored value (step SA8).

Step SA7 and step SA8 are executed for the same reasons as step SA3 and step SA4 described above.

After step SA7 or step SA8, the firmware execution unit 35 overwrites the actual firmware version number and the actual firmware version text string contained in the actual management data 38 to the number of the actual version and a text string denoting the actual version of the new firmware 37 after overwriting the firmware 37 (step SA9). As a result, the values of the number and the text string denoting the actual version of the firmware 37 in the actual management data 38 continue to identify the current version of the actual firmware 37.

The operation of the printer 12 is described in the flow chart in FIG. 4 using the reported firmware version number information and the reported firmware version string information by way of example. Whether the reported model ID, the reported original ID, and the reported ROM version contained in the reported management data 39 should be overwritten is also determined for the same reasons as the reported firmware version number information and the reported firmware version string information described above. Based on the results of these decisions, data is overwritten or overwriting data is avoided by the information updating unit 42 to conform with the status of the actual data.

More specifically, the actual model ID, actual original ID, and actual ROM version information contained in the actual management data 38 can be changed by someone with specific access rights as described above. When the actual model ID is overwritten by someone with such access rights, the actual model ID after being overwritten is the actual model ID of the printer 12. Likewise when the actual original ID and actual ROM version information are overwritten, the actual original ID and the actual ROM version information after being overwritten are the actual original ID and the actual ROM version information of the printer 12.

When, for example, the actual model ID contained in the actual management data 38 is overwritten, the firmware execution unit 35 determines if the reported model ID contained in the reported management data 39 was previously overwritten by the user using the same method described in step SA1 in FIG. 4. If the information was overwritten by a user command, the reported model ID was probably changed to a value that is easier for the user to understand or manage. Considering user convenience, the information updating unit 42 therefore does not overwrite the reported model ID. However, if the information was not overwritten by a user command, the information updating unit 42 overwrites the value of the reported model ID to the actual model ID after being overwritten so that the reported model ID and the actual model ID match.

The management information output unit 40 of the firmware execution unit 35 of the printer control unit 30 in the printer 12 is described next.

The management information output unit 40 reports information in the reported management data 39 as described below when a diagnostic test is run.

A diagnostic test is a function of the printer 12 that records information related to the printer 12 firmware 37, information related to communication functions, information related to recording, and other printer settings and configuration information on the thermal roll paper.

Information related to communication functions includes, for example, the communication program, the usable protocols, interface specifications, and the version of the interface board. Recording-related settings include information about the fonts recorded by the printer 12, recording speed, and print density, for example.

The diagnostic test is run to determine the cause of an error when a printer 12 error occurs, or to check configuration information when the printer 12 is not connected to the host computer 11, for example.

At least firmware 37 version number information, firmware string information, model ID information, original ID information, and ROM version information are recorded on the thermal roll paper by a function of the management information output unit 40 during the diagnostic test.

More specifically, when a diagnostic test is started, the management information output unit 40 references the reported management data 39 and gets the reported firmware version number information, reported firmware version string information, reported model ID, reported original ID, and reported ROM version information contained in the reported management data 39. The management information output unit 40 then controls the print engine 32 and records this information on thermal roll paper. As a result, the reported firmware version number information, reported firmware version string information, reported model ID, reported original ID, and reported ROM version information contained in the reported management data 39 are recorded on the thermal roll paper during the diagnostic test as the firmware 37 version number information, firmware version string information, model ID information, original ID information, and ROM version information.

As described above, the information contained in the reported management data 39 can be overwritten by user commands, and the user can rewrite the values of selected information for ease of understanding and management. During a diagnostic test in this embodiment, the management information output unit 40 records the reported firmware version number information contained in the reported management data 39 on thermal roll paper as the information about the firmware 37 version number.

As a result, when the reported firmware version number information has been overwritten by the user, the reported firmware version number information after being overwritten by the user is displayed as the information for the firmware 37 version number on thermal roll paper. The user can then easily acquire information about the firmware 37 version number by simply referring to the thermal roll paper.

This is the effect of the invention storing version number information in reported management data 39 that can be freely changed by the user separately from the firmware 37 version number that is stored in the actual management data 38, and using the reported management data 39 when reporting the firmware 37 version number information. This also applies to other information contained in the reported management data 39.

The management information output unit 40 reports information in the reported management data 39 as described below by cooperation with the printer driver execution unit 21 of the host computer 11.

The printer driver execution unit 21 has a function for displaying on the display panel a window in which at least firmware 37 version number information, firmware version string information, model ID information, original ID information, and ROM version information are presented in response to a user command.

When the user asserts a command to display this window, the printer driver execution unit 21 outputs a command requesting the return of information contained in the reported management data 39 to the management information output unit 40. When this command is received, the management information output unit 40 references the reported management data 39, retrieves the information contained in the data, and outputs the acquired information to the printer driver execution unit 21.

Based on the information contained in the acquired, reported management data 39, the printer driver execution unit 21 displays the reported firmware version number information as the information for the firmware 37 version number, displays the reported firmware version string information as the text string information for the firmware 37 version, displays the reported model ID as the model ID information, displays the reported original ID as the original ID information, and displays the reported ROM version information as the information about the ROM version in the window.

The effect of displaying the reported firmware version number information as the information about the firmware 37 version number in a window is thus the same as the effect of recording the value of the reported firmware version number information as the information related to the firmware 37 version number on thermal roll paper during a diagnostic test.

As described above, a printer 12 according to this embodiment of the invention has a printer storage unit 33 that stores actual management data 38 and reported management data 39 related to management information describing the state of components used to record on the thermal roll paper used as the recording medium. The management information specifically includes information identifying the firmware 37 version as a number, information identifying the firmware 37 version as a text string, model ID, original ID, and ROM version information, and the actual management data 38 contains information describing the actual state of the components, and the reported management data 39 contains information that is referenced when reporting the information to a user.

If the information contained in the reported management data 39 (such as the reported firmware version number information or reported firmware version string information) has not been changed in response to a user command to change the information when the state of a component related to recording on thermal roll paper changes (such as when overwriting in conjunction with a firmware 37 version change), the information updating unit 42 of the printer 12 overwrites the appropriate information with information denoting the actual state after the change (such as information identifying the actual version of the firmware 37 after being overwritten). If the user-definable information has been changed, the information updating unit 42 does not overwrite the information contained in the reported management data 39.

The user may change the information contained in the reported management data 39 for the user's convenience, such as to values that are easier for the user to understand or manage. When information contained in the reported management data 39 has been overwritten, retaining the values that were written for the user's convenience is more convenient for the user when state of a component has changed than overwriting the information contained in the reported management data 39 according to the change in the state of the component.

User convenience is thus improved when information about a specific component contained in the reported management data 39 has been overwritten by a user command and the state of a specific component changes because the user-defined information is not overwritten and the value written by the user is retained. On the other hand, because the information is overwritten to a value denoting the actual state of the specific component when the corresponding user-definable value has not been changed by the user, the value of the information contained in the reported management data 39 is prevented from differing more than necessary from the value denoting the actual state of the specific component. As a result, the reliability of the information contained in the reported management data 39 can be maintained while also assuring user convenience by enabling the user to change information contained in the reported management data 39.

The printer 12 according to this embodiment of the invention also has a management information output unit 40 that outputs information contained in the reported management data 39 in a specific format based on the reported management data 39 stored in the printer storage unit 33.

Because the management information output unit 40 thus outputs the values written by the user for information contained in the reported management data 39 that the user changed for the user's convenience, the user can easily learn the state of specific components based on information output in a format convenient for the user.

During a diagnostic test, the management information output unit 40 records the values of the reported firmware version number information, reported firmware version string information, reported model ID, reported original ID, and reported ROM version information contained in the reported management data 39 on thermal roll paper as the firmware 37 version number information, firmware version string information, model ID information, original ID information, and ROM version information in this embodiment of the invention.

Therefore, when the reported firmware version number information is overwritten by the user, the value of the reported firmware version number information after being overwritten by the user is displayed as the information about the version number of the firmware 37 on thermal roll paper in the diagnostic test, and the user can easily get information about the firmware 37 version number by referring to the thermal roll paper.

This is the effect of the invention storing version number information in reported management data 39 that can be freely changed by the user separately from the version number of the firmware 37 installed in the printer that is stored in the actual management data 38, and using the reported management data 39 when reporting the firmware 37 version number information. This also applies to other information contained in the reported management data 39.

In this embodiment of the invention actual management data 38 containing information describing the actual version of the firmware 37 (actual firmware version number, actual firmware version text string), and reported management data 39 containing information that is referenced to report the firmware 37 version information (reported firmware version number information, reported firmware version string information), are stored as information about the firmware 37 version in the printer storage unit 33. If the firmware 37 is overwritten and the information contained in the reported management data 39 was not previously overwritten in response to input of a command to change the information, the information updating unit 42 overwrites the version information contained in the reported management data 39 with information denoting the actual version of the firmware 37 after being overwritten. If information contained in the reported management data 39 was previously overwritten, the version information contained in the reported management data 39 is not overwritten and the existing value is retained.

The basic control firmware 37 of the printer 12 may be overwritten or updated when the version changes to add new functions or solve a problem. When the firmware 37 is overwritten, the content of information contained in the reported management data 39 can thus be maintained appropriately according to whether or not the information was changed by the user.

This embodiment of the invention reports information in the reported management data 39 on the host display unit 15 by cooperation with the printer driver execution unit 21 of the host computer 11.

More specifically, the printer driver execution unit 21 has a function for displaying on the display panel a window in which at least firmware 37 version number information, firmware version string information, model ID information, original ID information, and ROM version information are presented in response to a user command.

When the user asserts a command to display this window, the printer driver execution unit 21 outputs a command requesting the return of information contained in the reported management data 39 to the management information output unit 40. When this command is received, the management information output unit 40 references the reported management data 39, retrieves the information contained in the data, and outputs the acquired information to the printer driver execution unit 21.

Based on the information contained in the acquired, reported management data 39, the printer driver execution unit 21 displays the reported firmware version number information as the information for the firmware 37 version number, displays the reported firmware version string information as the text string information for the firmware 37 version, displays the reported model ID as the model ID information, displays the reported original ID as the original ID information, and displays the reported ROM version information as the information about the ROM version in the window.

The effect of displaying the reported firmware version number information as the information about the firmware 37 version number in a window is thus the same as the effect of recording the value of the reported firmware version number information as the information related to the firmware 37 version number on thermal roll paper during a diagnostic test.

It will be obvious to one with ordinary skill in the related art that the invention is not limited to the embodiment described above and can be varied and adapted in many ways without departing from the scope of the accompanying claims.

For example, an LCD panel or other display device could be disposed to the printer 12, and when the user asserts a command to display information about the firmware version, the reported firmware version number information and reported firmware version string information contained in the reported management data 39 could be retrieved and the values output on the display.

In addition, firmware 37 version number information, firmware version string information, model ID information, original ID information, and ROM version information are described as examples of management information in the foregoing embodiment, but the management information is not so limited. That is, the management information is a concept that broadly includes information describing the state of components used to record on a recording medium. More specifically, in the embodiment described above information related to components used for communication and information related to recording settings are recorded on thermal roll paper, and this information can therefore be treated as management information. In other words, information denoting the actual state of communication components and information used for reporting can be stored as the information related to the communication components, and information denoting the actual state of recording components and information used for reporting can be stored as the information related to the recording components.

The printer 12 is also described as a thermal printer in the foregoing embodiment, but the printer 12 is not limited to thermal printers and could be an inkjet printer or dot impact printer, for example.

Variations (1) The reported firmware version number information is not overwritten when the reported firmware version number information has been overwritten by the user in the embodiment described above. This can result in the value of the reported firmware version number information temporarily not corresponding to the version of the firmware 37 that is installed in the printer. To avoid this, a message indicating that firmware 37 was installed could be presented on a display unit when new firmware 37 is installed. More particularly, when the reported firmware version number information is overwritten by a user command, a message indicating that the installed version of the firmware 37 changed is displayed on a display unit or in a window for controlling overwriting the firmware 37. This message can prompt the user to change the reported information to correspond to the newly installed firmware 37. As a result, a state in which the reported firmware version number information does not correspond to the installed version of the firmware 37 can be quickly remedied.

(2) Alternatively, an overwrite configuration window could be installed when new firmware 37 is installed instead of displaying a message that new firmware 37 was installed. By displaying an overwrite configuration window when new firmware 37 is installed, the user can be prompted to change the reported firmware version number information.

(3) Reported version number information for each installed version could be stored, and the version number information used for reporting could be displayed for each stored version. By storing a change history instead of overwriting the reported version number information when new firmware 37 is installed, the relationship between the installed version of the firmware and the version number information used for reporting can be known.

The firmware version and corresponding reported version number information are used as an example in the above variation, but the invention is not so limited. When both management information and reported information are stored, the invention can be applied to any data that is stored as management information and reported information.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

TEXT IN THE FIGURES

FIG. 1
HOST COMPUTER 11
HOST INPUT UNIT 14
HOST DISPLAY UNIT 15
HOST CONTROL UNIT 13
POS APPLICATION EXECUTION UNIT 20
PRINTER DRIVER EXECUTION UNIT 21
INTERFACE 16
HOST STORAGE UNIT 17
PRINTER 12
INTERFACE 31
PRINT ENGINE 32
PRINTER CONTROL UNIT 30
FIRMWARE EXECUTION UNIT 35
INFORMATION UPDATING UNIT 42
MANAGEMENT INFORMATION OUTPUT UNIT 40
PRINTER STORAGE UNIT 33
FIRMWARE 37
ACTUAL MANAGEMENT DATA 38
REPORTED MANAGEMENT DATA 39← 変更しました。
FIG. 2
(A)
ACTUAL FIRMWARE VERSION NUMBER
ACTUAL FIRMWARE VERSION STRING
ACTUAL MODEL ID
ACTUAL ORIGINAL ID
ACTUAL ROM VERSION
(B)
REPORTED FIRMWARE VERSION NUMBER
REPORTED FIRMWARE VERSION STRING
REPORTED MODEL ID
REPORTED ORIGINAL ID
REPORTED ROM VERSION
FIG. 3
REPORTED FIRMWARE VERSION NUMBER
REPORTED FIRMWARE VERSION STRING
REPORTED MODEL ID
REPORTED ORIGINAL ID
REPORTED ROM VERSION
SAVE
FIG. 4
START
SA1 DETERMINE IF REPORTED FIRMWARE VERSION NUMBER WAS UPDATED
SA2 UPDATED?
SA3 OVERWRITE
SA4 SAVE VALUE WITHOUT OVERWRITING
SA5 DETERMINE IF REPORTED FIRMWARE VERSION STRING WAS UPDATED
SA6 UPDATED?
SA7 OVERWRITE
SA8 SAVE VALUE WITHOUT OVERWRITING
SA9 OVERWRITE ACTUAL MANAGEMENT DATA
END

What is claimed is:

1. A method of controlling a recording device, comprising:
updating firmware that controls a recording unit that records to a recording medium;
overwriting management information stored in a storage memory unit based on updating the firmware, wherein the management information is related to version information of the firmware, and wherein the management information cannot be rewritten by a user; and
outputting report information stored in the storage memory unit that was changed based on information input by the user via an input unit if the report information is changed based on information input by the user when output of report information including information related to the firmware is requested after the firmware is updated, wherein the report information can be rewritten by the user and
outputting the report information based on the overwritten management information when the report information for the firmware is changed by the user,
wherein, when the management information is overwritten:
when the report information was previously changed based on information input by the user, the report information is not overwritten, and
when the report information was not changed by the user, the report information is changed based on the overwritten management information.

2. The method of controlling a recording device described in claim 1, further comprising printing the report information on the recording medium by the recording unit.

3. A recording device comprising:
a recording unit that records on a recording medium;
a control unit that controls the recording unit;
a storage memory unit that:
stores management information related to version information of firmware of the control unit, wherein the management information cannot be rewritten by a user, and
stores report information corresponding to the management information, wherein the report information can be rewritten by the user;
an input unit that allows the user to input information to change the report information; and
an output unit that outputs the report information stored in the storage memory unit,
wherein, when the management information is overwritten:
when the report information was previously changed based on information input by the user, the report information is not overwritten, and
when the report information was not changed by the user, the report information is changed based on the overwritten management information.

4. The recording device described in claim 3, wherein the firmware is input to the control unit, and the control unit controls the recording unit based on the firmware.

5. The recording device described in claim 3, wherein:
the output unit outputs the report information to the recording unit; and
the recording unit records the report information output by the output unit to the recording medium.

6. The recording device described in claim 3, further comprising:
a display unit that displays the report information;
wherein the output unit outputs the report information to the display unit.

7. A recording system comprising:
a recording unit that records on a recording medium;
a control unit that controls the recording unit;

a storage memory unit that:
- stores management information related to version information of firmware of the control unit, wherein the management information cannot be rewritten by a user, and
- stores report information corresponding to the management information, wherein the report information can be rewritten by the user;

an input unit that allows the user to input information to change the report information;

an output unit that outputs the report information stored in the storage memory unit; and a transmission unit that transmits information related to the management information, wherein, when the management information is overwritten:
- when the report information was previously changed based on information input by the user, the report information is not overwritten, and
- when the report information was not changed by the user, the report information is changed based on the overwritten management information.

* * * * *